United States Patent
Gero et al.

(10) Patent No.: US 12,401,620 B2
(45) Date of Patent: Aug. 26, 2025

(54) ESTABLISHING ON DEMAND CONNECTIONS TO INTERMEDIARY NODES WITH ADVANCE INFORMATION FOR PERFORMANCE IMPROVEMENT

(71) Applicant: Akamai Technologies, Inc., Cambridge, MA (US)

(72) Inventors: Charles E Gero, Quincy, MA (US); David Tang, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 195 days.

(21) Appl. No.: 18/327,659

(22) Filed: Jun. 1, 2023

(65) Prior Publication Data
US 2024/0406137 A1    Dec. 5, 2024

(51) Int. Cl.
*H04L 9/40* (2022.01)

(52) U.S. Cl.
CPC ........ *H04L 63/0209* (2013.01); *H04L 63/029* (2013.01)

(58) Field of Classification Search
CPC ............... H04L 63/0209; H04L 63/029; H04L 63/0272
See application file for complete search history.

(56) References Cited

U.S. PATENT DOCUMENTS

| | | | | |
|---|---|---|---|---|
| 6,820,133 B1* | 11/2004 | Grove | ..................... | H04L 69/08 709/241 |
| 7,274,658 B2* | 9/2007 | Bornstein | ............... | H04L 67/61 370/227 |
| 7,660,296 B2* | 2/2010 | Fletcher | .............. | H04L 61/2567 370/409 |
| 8,341,295 B1* | 12/2012 | Liu | ........................ | H04L 63/102 709/224 |
| 8,588,233 B1* | 11/2013 | Lohner | ............... | H04L 61/2589 370/392 |
| 9,455,960 B2* | 9/2016 | Budhani | .................. | H04L 63/04 |
| 9,479,481 B2 | 10/2016 | Budhani et al. | | |
| 9,479,482 B2 | 10/2016 | Budhani et al. | | |
| 9,491,145 B2* | 11/2016 | Budhani | ............. | H04L 63/0218 |
| 9,628,455 B2* | 4/2017 | Ayyadevara | .......... | H04L 9/3213 |
| 9,667,619 B1* | 5/2017 | Vera-Schockner | ... | H04L 69/162 |
| 10,931,452 B2* | 2/2021 | Ayyadevara | ........ | H04W 12/069 |
| 10,951,407 B2* | 3/2021 | Gill | ..................... | H04L 63/0442 |
| 10,958,444 B2* | 3/2021 | Gill | ........................ | H04L 63/06 |
| 11,546,444 B2* | 1/2023 | Ayyadevara | ........ | H04L 67/1097 |

(Continued)

OTHER PUBLICATIONS

Wikipedia, 'Dynamic Host Configuration Protocol,' May 2023, 25 pages. Available at: https://en.wikipedia.org/w/index.php?title=Dynamic_Host_Configuration_Protocol&oldid=1156405591.

Droms, R., 'RFC 2131, Dynamic Host Configuration Protocol,' Mar. 1997, 45 pages. Available at: https://www.rfc-editor.org/rfc/pdfrfc/rfc2131.txt.pdf.

(Continued)

*Primary Examiner* — J. Brant Murphy

(57) ABSTRACT

An agent deployed within a private network creates on-demand connections to an intermediary node outside the private network. When a client contacts the intermediary node for an application or more generally any service available from within the private network, the intermediary node signals the agent to create the on-demand connection outbound to the intermediary. The agent may include advance information in the signal that accelerates the establishment of the on-demand connection and/or transmission of responsive data to the client.

23 Claims, 5 Drawing Sheets

(56) References Cited

U.S. PATENT DOCUMENTS

| | | | | |
|---|---|---|---|---|
| 11,552,997 | B2* | 1/2023 | Williams | H04L 9/3247 |
| 11,576,102 | B2* | 2/2023 | Yang | H04W 40/248 |
| 11,610,011 | B2* | 3/2023 | Tang | H04L 9/3213 |
| 12,278,880 | B2* | 4/2025 | Shribman | G06Q 50/16 |
| 2004/0161097 | A1* | 8/2004 | Henry | H04M 15/51 |
| | | | | 379/266.02 |
| 2005/0018829 | A1* | 1/2005 | Baker | H04M 3/4931 |
| | | | | 379/218.01 |
| 2007/0245409 | A1* | 10/2007 | Harris | H04L 67/06 |
| | | | | 726/5 |
| 2015/0067819 | A1* | 3/2015 | Shribman | H04L 63/029 |
| | | | | 709/218 |
| 2015/0264055 | A1* | 9/2015 | Budhani | H04L 63/0281 |
| | | | | 726/4 |
| 2022/0353781 | A1* | 11/2022 | Yang | H04W 40/026 |

OTHER PUBLICATIONS

Reddy, T., et al., 'RFC 8656, Traversal Using Relays around NAT (TURN): Relay Extensions to Session Traversal Utilities for Nat (Stun),' Feb. 2020, 79 pages. Available at: https://www.rfc-editor.org/info/rfc8656.

Rosenberg, J., et al., IETF 5245, 'Interactive Connectivity Establishment (ICE): A Protocol for Network Address Translator (NAT) Traversal for Offer/Answer Protocols,' Apr. 2010, 117 pages. Available at: https://www.rfc-editor.org/rfc/rfc5245.

Rosenberg, J., et al., RFC 3264, An Offer/Answer Model with the Session Description Protocol (SDP), V Jun. 2002, 25 pages. Available at: https://www.rfc-editor.org/rfc/rfc3264.

What Are STUN, TURN, and ICE? | LiveSwitch Server Documentation, Mar. 20, 2023, 4 pages. Available at: https://developer.liveswitch.io/liveswitch-server/guides/what-are-stun-turn-and-ice.html.

* cited by examiner

ESTABLISHING ON DEMAND CONNECTIONS TO INTERMEDIARY NODES WITH ADVANCE INFORMATION FOR PERFORMANCE IMPROVEMENT

BACKGROUND

Technical Field

This patent document generally relates to computer networking.

Brief Description of the Related Art

In Zero Trust Network Access (ZTNA) and Software-Defined WAN architectures, it is common to see intermediary nodes along the path between a given source and destination node. For example, a common method to protect the destination node from unwanted inbound connections is to utilize a firewall that blocks inbound traffic to the destination node located inside a private network (such as an enterprise network).

It is known in the art for such a destination node to initiate an connection outbound to the intermediary node on the public Internet, see e.g., U.S. Pat. No. 9,491,145 (Secure Application Delivery System With Dial Out and Associated Method), the contents of which are hereby incorporated by reference in their entirety. That connection serves as a tunnel into the private network. When a source node (e.g., an end user client) wants to connect to the destination node, it is directed to connect to the intermediary node. The intermediary node stitches that connection to the previously created outbound connection (the tunnel) from the destination node. The result is to create a façade of an end to end connection between the source and destination nodes. The intermediate node can then proxy the traffic between the source and destination. In this way, a remote client can gain access to a private application running on the destination node, for example.

One problem with this method is that source nodes must connect to an intermediary node where the desired destination node has already established the tunnel. Today, this is typically done by using static mappings for destination-_node: intermediary_nodes [ ], or dynamically by requiring complex mapping logic that dictates how the source is to find an intermediary node.

From the perspective of network performance, routing, and load balancing, it is desirable that the source node be attached to an optimal intermediary node. But, given a total set of N intermediary nodes, only the subset M intermediary nodes that are connected to a given destination node are available for source nodes to be routed to. As a result, performance optimization load-balancing connections can only be distributed across the subset M intermediary nodes. Hence, the full power of existing mapping systems, which provide performance optimization and load balancing systems across all N nodes, cannot be realized.

It is an object of this patent document to improve the flexibility of connections into private networks from an overlay network. It is also an object of this patent document to improve the performance of such connections, and to improve the speed with which such connections can be created and used to relay data and/or receive services from the private network. These and other advantages and improvements will become apparent to those skilled in the art upon review of this disclosure.

More information about zero trust network access and software defined WAN architectures can be found in the following US patents, all of which are hereby incorporated by reference in their entirety: U.S. Pat. Nos. 7,274,658, 9,491,145, 9,479,481, 9,479,482, 9,455,960, 9,628,455, 10,958,444, 10,951,407, 10,931,452, 6,820,133, 7,660,296, 8,341,295, 11,552,997, 11,546,444.

The teachings presented herein improve the functioning of computers and computer networks themselves.

BRIEF SUMMARY

This section describes some pertinent aspects of this invention. Those aspects are illustrative, not exhaustive, and they are not a definition of the invention. The claims of any issued patent define the scope of protection.

An agent deployed within a private network creates on-demand connections to an intermediary node outside the private network. When a client contacts the intermediary node for an application or more generally any service available from within the private network, the intermediary node signals the agent to create the on-demand connection outbound to the intermediary. The agent may include advance information in the signal that accelerates the establishment of the on-demand connection and/or transmission of responsive data to the client. The on-demand connection will typically go through a firewall that separates the private network from the public Internet and the intermediary node. The intermediary node may be one of many such nodes deployed around the Internet to form an overlay network. The overlay network is associated with a service provider and is used to accelerate, secure, or otherwise enhance remote client access to services available in the private network.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
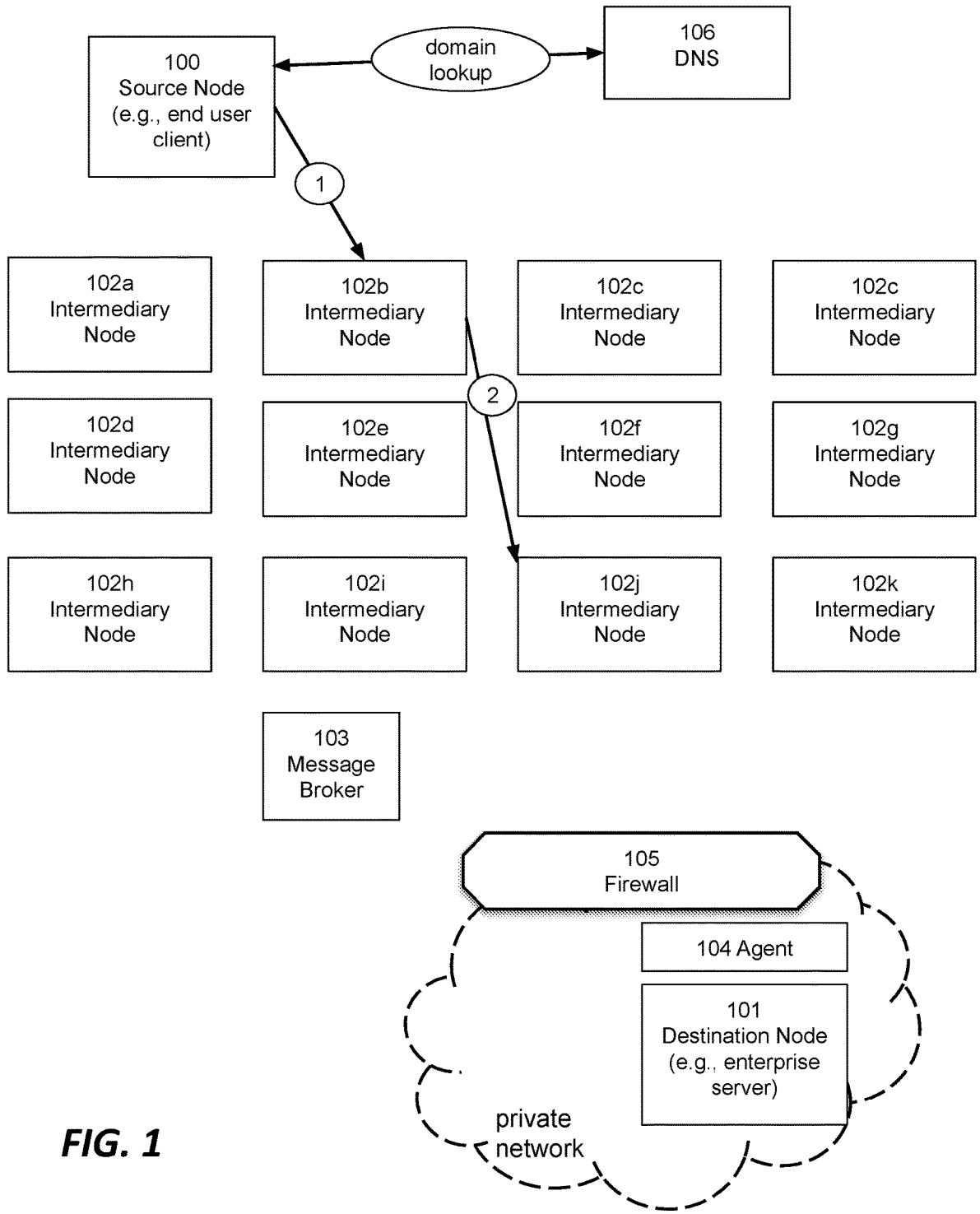
FIG. 1 is a diagram illustrating a system, in accordance with one embodiment of the teachings hereof.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, HTTP versions 1.1 and 2 and 3, MQTT, TCP/IP, and UDP, is assumed.

All references to HTTP should be interpreted to include an embodiment using encryption (HTTP/S), such as when TLS secured connections are used. While context may in specific instances indicate the hardware or the software exclusively, should such distinction be appropriate, the teachings hereof can be implemented in any combination of hardware and software. Hardware may be actual or virtualized.

Overview

When a source node (client) contacts an intermediary node to contact an application or more generally to get a service available from within a private network, the intermediary node signals an agent in the private network to initiate an on-demand connection out to the intermediary node. This on-demand connection is typically made through a firewall separating the private network from the intermediary node on the public Internet. It then serves as a tunnel into the private network.

Preferably, once a source node contacts the intermediary node, the intermediary node sends a signal to a message broker providing publication/subscribe functionality. The message broker delivers the signal on a pub-sub topic/channel that the destination node is subscribed to. The signal instructs the destination node to initiate the on-demand connection to the specified intermediary node to serve as the tunnel. The signal may include the IP address or other identifier for the intermediary node, as well as information helpful to accelerate the establishment, securing, and/or operation of the tunnel and/or the provision of the service to the source node. Once the tunnel is established, the original source node connection can be stitched forward into the tunnel to the destination.

Typically, the intermediary node is part of a larger platform known as an overlay network. Many such intermediary nodes can be deployed and provisioned across the Internet by a service provider. The service provider manages the overlay network, providing a variety of infrastructure as a service (IaaS) and software as a service (SaaS) services. Such services can include accelerating, securing, or otherwise enhancing remote client access to private network applications and servers. The service provider can operate a mapping system to direct clients to selected intermediary nodes, and to route traffic in and amongst the intermediary nodes to the destination.

The techniques described in this patent document enable existing routing systems—which assume that intermediate nodes are able to establish forward bound connections to the destination (e.g., SureRoute, BGP, OSPF, etc)—to work in an environment where a destination is actually not yet reachable on a forward-bound connection. In contrast to conventional techniques, the teachings hereof are used to initiate an on-demand tunnel outbound from the destination back to the intermediary and to do so in an expedited manner.

Example System

FIG. 1 illustrates an example of an overlay network formed by a set of intermediary nodes 102a-k (generally "102"), which should be understood to be deployed in various locations around the Internet. (Note that in some cases, the intermediary nodes 102 may be referred to as bridging nodes or switching nodes, with no material difference in meaning as relates to the subject matter hereof.)

Each intermediary node 102 may be implemented, for example, as a proxy server process executing on suitable hardware and located in a datacenter with network links to one or more network service providers. As mentioned, intermediary nodes 102 can be deployed by a service provider to provide a secure application access service for source nodes 100 (e.g., an end user client) to connect to a destination node 101 (e.g., an enterprise server) that is located in a private network (e.g., the enterprise's network). A typical example of a private network is an corporate network separated from the overlay network and indeed the public Internet by a security boundary such as a NAT and/or firewall 105, as illustrated.

Also shown in FIG. 1 is a request routing component, in this example a DNS system 106, which operates to direct given source nodes 100 to a selected intermediary node 102. The selection of intermediary nodes 102 is determined, typically, based on the relative load, health, and performance of the various intermediary nodes, and is well known in the art. Intermediary nodes 102 that are closer (in latency, or network distance, terms) to the source node 100 usually provide a better quality of service than those farther away. This information is used by the DNS 106 to return the IP address of a selected intermediary node 102, that is, in response to a domain lookup initiated by or on behalf of the source node 100. Again, such request routing technologies are well known in the art, and more details can be found for example in U.S. Pat. No. 6,108,703, the contents of which are hereby incorporated by reference.

Finally, FIG. 1 shows a message broker 103, and an agent 104. The message broker can be realized, e.g., as a publication/subscriber service such as MQTT or Apache Kafka. As such that broker 103 represents a set of one or more interconnected servers providing the message broker service. The agent 104 can be an appliance or piece of software in the private network which helps facilitate on-demand connections out to the overlay network and bridge connections to the destination node. The agent 104 is sometimes referred to as a 'connector' application. The agent 104 may be combined or otherwise communicatively coupled to one or more destination nodes. All of the foregoing components will be discussed in more detail in the following sections.

Example Operational Sequence

Still with reference to FIG. 1, initially the source node 100 sends (or a recursive DNS resolver sends on its behalf) a DNS request to resolve a domain name associated with the desired service ("domain lookup"). That domain name is CNAMEd to another name for which the DNS 106 is authoritative (or the DNS 106 is made authoritative for the original hostname). Either way, the result of the domain lookup process is an IP address that points to a selected intermediary node, in this example 102b.

The source node 100 sends a message(s) to intermediary node 102b over the Internet seeking a service from the destination node 101 (arrow 1). The job of the intermediary node 102b (and the system in general) is to tunnel the traffic from source node 100 to destination node 101. The term "tunnel" in this context is used to refer to encapsulation of data sent from the source node 100 to the destination node 101, and vice versa. It is not limited to any particular protocol. The following table, however, provides some non-limiting examples:

TABLE 1

| Source node to destination node | Tunnel (Between intermediary nodes & intermediary nodes to Agent 104) |
|---|---|
| TCP/IP packets (TLS secured or not) | TCP/TLS, GRE, IPSec, Custom, or multiplexed protocols, e.g., HTTP2, QUIC |
| IP packets (TCP terminated at overlay or agent) | TCP/TLS, GRE, IPSec, Custom, or multiplexed protocols, e.g., HTTP2, QUIC |
| HTTP messages, or HTTP message bodies | TCP/TLS, GRE, IPSec, Custom, or multiplexed protocols, e.g., HTTP2, QUIC |

As shown by arrow 2, intermediary node 102b determines to tunnel the source node's traffic to node 102j, which is another node in the overlay network. Nodes 102b and 102j may have a previously established pool of connections between them which can be reused for this purpose. (Such inter-node connections may employ enhanced communication protocols between them, e.g., U.S. Pat. No. 6,820,133, the contents of which are hereby incorporated by reference.) Of course, the source node's traffic could be tunneled across the overlay via any one or more intermediary nodes; the example of two nodes shown in FIG. 1 is not limiting.

Figure 2:
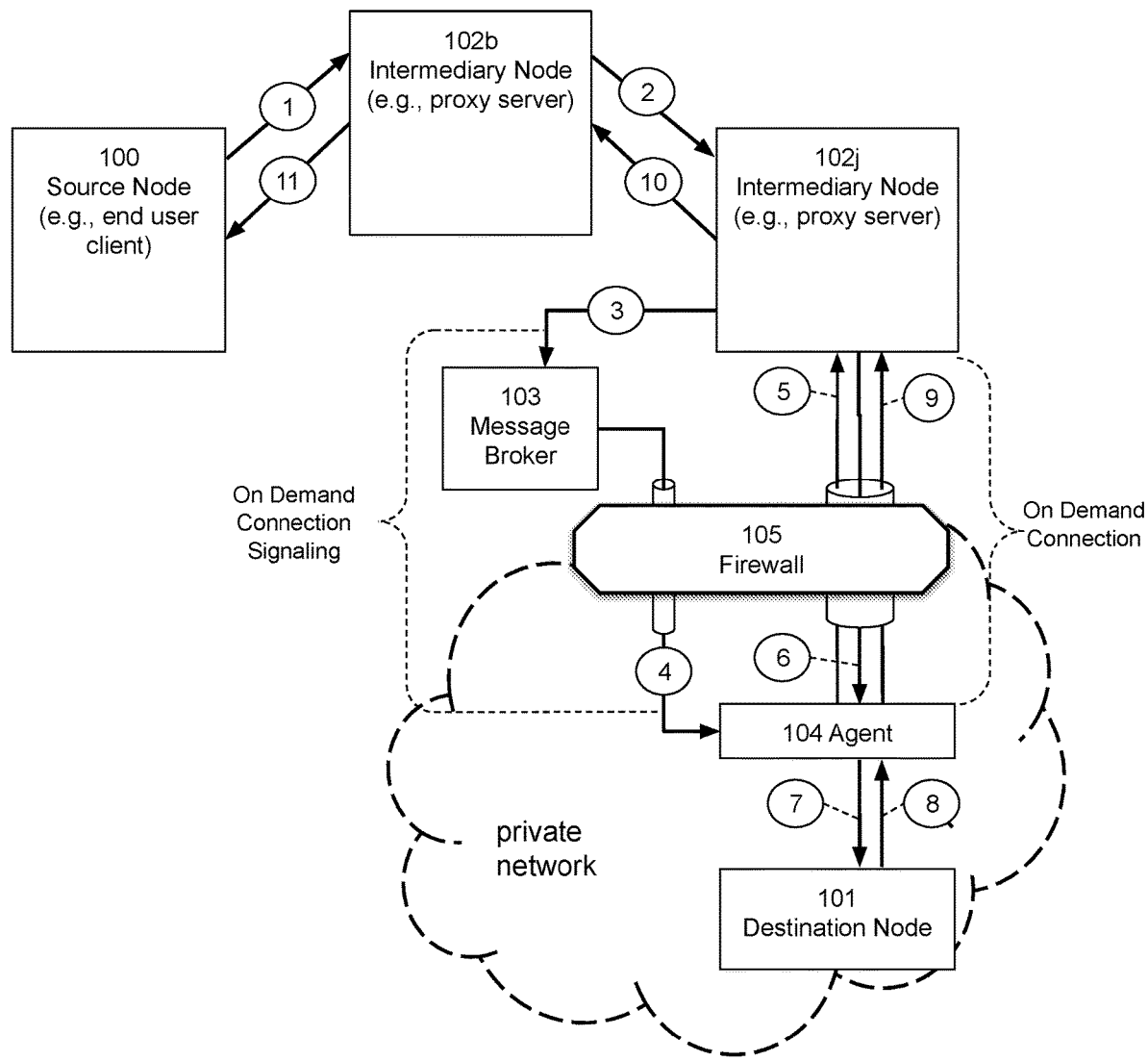
FIG. 2 is a diagram focusing on certain aspects of the system shown in FIG. 1.

When node 102b reaches out to 102j, node 102j is not connected to agent 104 and/or the destination node 101. To make such a connection, an on-demand connection outbound from agent 104 is initiated. FIG. 2 illustrates that process. FIG. 2 references the same system shown in FIG. 1, and arrows 1 and 2 represent the same operations already described for FIG. 1). However FIG. 2 focuses on certain components in detail to show the process for the on-demand connection.

Starting at arrow 3 of FIG. 2, node 102j signals message broker 103 to notify agent 104 that node 102j needs an on-demand connection outbound from the agent 104/destination node 101.

The message broker 103 operates a message delivery service in the manner of, e.g., a pub-sub mechanism in which agent 104 (and other agents like it deployed in other private networks) are subscribed to topics advertised by the message broker 103. An appropriate topic might be related to the private network owner or the destination node 101.

Arrow 4 of FIG. 2 shows the message broker delivering the signal from the intermediary node 102j to agent 104. The signal can be delivered through a long-lived communication channel (e.g., a persistent connection) that is previously established through the firewall 105. For example, upon initialization the agent 104 may reach out to the overlay network to register and be instructed to dial out to a given IP address of the message broker 103.

It should be understood that, preferably, the signal is a message that contains information identifying the intermediary node 102j, e.g., by IP address, and it may contain other information necessary or helpful to set up the outbound connection to the intermediary node 102j, as will be described later.

In response to receiving the signal at arrow 4, agent 104 initiates an on demand connection through the firewall and out to intermediary node 102j (arrow 5). At this point, node 102j can associate the tunnel from intermediary node 102b with the tunnel into private network to agent 104. Using this tunnel, intermediary nodes 102b and 102j can proxy data from the source node 100 to the agent 104 (arrows 1, 2, 6), which in turn can proxy the data to destination node 101 (arrow 7). Likewise data from the destination node 101 can be proxied back to the source node 100 (arrows 8, 9, 10, 11). Source and destination thus can have connectivity. Broadly speaking, any data (e.g., requests and responses) sent from source node 100 to destination node 101 can be tunneled via nodes 102b, 102j, and agent 103 to the destination node, and responses from destination node 101 can likewise be tunneled back to the source node 100 so as to provide the requested private service.

Benefits & Advantages

The teachings hereof provide on-demand forward path connections, and such connections can extend into private networks. The conventional notion of destination nodes initiating connections outbound to an intermediary is enhanced with on-demand, dynamic creation of connections. These teachings enable improved routing across the overlay network and better use of resources, as connections do not need to be established ahead of time (as they might be idle) and traffic from a source node can be routed to the best intermediary node (as determined by conventional routing, load balancing and related algorithms) rather than needing to go to an intermediary node that already has a pre-existing connection with the destination node.

The approach described herein means that no exceptions to one's inbound firewall rules (e.g., to accommodate inbound connection requests) are needed. It does not restrict usable intermediary nodes to any subset of the total N intermediary nodes. It does not require the destination node to prewarm connections to all, or any, intermediary nodes. And it does not require routing logic for the source node to select an intermediary node with a pre-established tunnel to the destination node. Instead, source nodes can be routed across the overlay to any intermediary node that is desired. This ability enables the system to do things such as prioritizing the least loaded intermediary node, the intermediary node closest to the source, the intermediary node closest to the destination, or other factors.

Generalizing, the teachings hereof enable improved routing across the overlay and better use of resources, as connections to do not need to be established ahead of time (and potentially left idle) and traffic from a source node can be routed to the best intermediary node (as selected by routing, load balancing and related algorithms) rather than needing to go to the node that already has a connection with the destination node.

It should be understood that the foregoing is a description of potential benefits and advantages of certain embodiments of the invention. They may be achieved depending on implementation. But practicing the invention does not require, and does not necessarily involve, the achievement of any particular benefit or advantage identified herein.

Extensions & Alternatives; On-Demand Connection Signal With Advance Information

As mentioned above, the teachings of this document include extending the use of the intermediary node's 102j signal (arrows 3, 4). The signal can be structured to carry information that will accelerate the time needed to establish the outbound connection, to encrypt data traveling over that connection, to relay initial application layer data (e.g., requests and responses), and/or otherwise to facilitate the start of communication between source node 100 and destination node 101. A metric such as "time to first byte" might be used to quantify this improvement. In sum, the signal to create an outbound connection can carry "advance" information that accelerates, in some way, the providing of the private service from the destination node 101 to the source node 100. This may be accomplished in a variety of ways, as discussed below. It should be understood that the techniques described below are not mutually exclusive with one another but rather can be used together to achieve synergistic results; they are composable.

Pre-warm Agent to Destination Node Connection. The signal (arrows 3, 4) sent from the broker 103 can be configured to carry the IP address and/or port for the destination node 101. Doing so enables the agent 104 to pre-warm a connection to the destination node 101 at the same time that the on-demand connection is being established outbound from the agent 104 to the intermediary node 102j. After the source node's 100 tunneled data arrives at the agent 104, its connection to the destination node 101 is already pre-warmed and ready to be used. Otherwise, the agent 104 may have to wait to establish such a connection until after it determines that the data it is receiving through the tunnel from the intermediary node 102j is for the destination node 101. That is because an agent 104 may serve multiple destination nodes 101 (not all shown in the diagrams) in the private network.

Pre-seed information. Information can be included in the signal (arrows 3, 4) to accelerate the future steps of end to end communication establishment. The following are some examples.

A. Agent to Intermediary Node Connection; Transport Optimization

Connection establishment between the agent 104 and intermediary node 102j can be expedited by leveraging the fact that the agent 104 has a trusted connection with the broker 103. In the out of band signal that is sent from the intermediary node 102j to the agent 104 (arrows 3, 4), the intermediary node 102j can include a TCP SYN for the agent 104. The agent 104 can consume this SYN and immediately respond with a SYN ACK to the intermediary node 102j. This eliminates at least one-half round trip for the intermediary node 102j to agent 104 connection.

An alternate way to accomplish the same thing is to not have the intermediary node 102j piggyback a SYN, but instead allow the agent 104 to select the ports for the TCP-tuple. This is now described.

In a typical TCP handshake, the client (or the initiating side of the connection) selects the source port number used in the SYN, while choosing the destination port according to an agreed upon port number that the server (the passive side of the connection) is listening on for a given service. When the server responds to the client with a SYN/ACK, it sets the destination port to the number used as the source port from the client's SYN. The reason for this is so that the client can maintain state and ensure that no source ports collide with another TCP connection that shares the same source IP, destination IP, destination port tuple.

Figure 3:
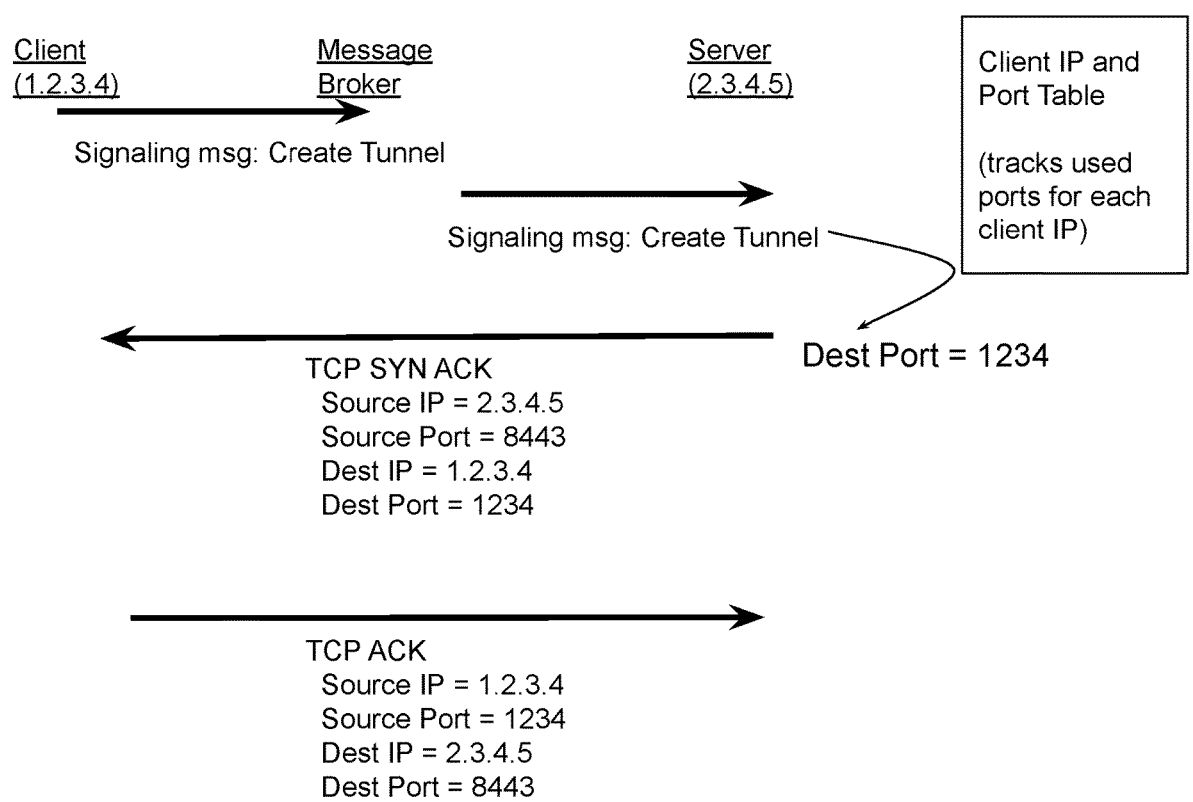
FIG. 3 is a diagram illustrating enhanced TCP connection establishment in which the server selects the source port number, in accordance with one embodiment of the teachings hereof.

Using the approach described herein, and as illustrated in FIG. 3, a server (the Agent 104 or destination node 101) could keep this same state for each client IP address (where client is an intermediary node 102, such as 102j). As a result, the out-of-band signaling message from the intermediary node 102j can be very minimal. The agent 104 or destination node 101 could instead select the intermediary node's 102j port number, while ensuring that it is an unused port. If this were supported, it would be feasible to also have one signaling message resulting in N server-side initiated tunnel connections by selecting N unused port numbers if there was a desire to create multiple tunnels.

This optimized connection establishment mechanism could also be leveraged if the server-side agent 104 wanted to create tunnel connections to multiple intermediary nodes 102 in response to the signal from the message broker 103 (rather than just a single one); which is described in a later section titled "Tunnel Fan Out". In that scenario, an intermediary node 102 that did not initiate the connection (that is, other than 102j in the FIG. 3 example) such as 102k might receive a TCP SYN/ACK from the agent 104. Such intermediary node 102k would likely drop this packet as an unknown connection, unless there is another mechanism for it to understand what is occurring. More specifically, the intermediary node ought to have a way of trusting this gratuitous SYN/ACK. This method can be done by embedding a cryptographic signature or shared secret into a network message. For example, such a secret or signature could be included at Layer 7, within Layer 4 information such as sequence number or in a TCP options field, or even at Layer 3 in an IP options field.

B. Encryption Layer Establishment (Security and Authenticity Optimization)

Encryption layer establishment can also be expedited using a similar approach of piggybacking information into the on-demand connection signal. More specifically, cryptographic information can be included in the signal (arrows 3, 4) to accelerate the encryption layer establishment (e.g., TLS handshake) of the on demand connection (arrow 5), if needed. For example, a TLS Client Hello from the intermediary node 102j can be carried in the signal to save on at least one half round-trip if this connection were going to be upgraded to TLS eventually. Alternatively, if the channel from intermediary node 102*j* to message broker 103 to agent 104 is secure, the intermediary node 102*j* can leverage this attribute to send a symmetric key as part of the on-demand connection signaling, allowing the agent 104 to immediately switch to an encrypted channel after a TCP handshake with the intermediary node 102*j* (arrow 5).

Meta information about the cryptographic algorithm can also be included. With the keying information pre-established, the agent 104 could simply switch to an encrypted channel with the intermediary node 102*j* immediately upon establishing a connection between agent 104 and intermediary node 102*j*.

An alternate way to accomplish this could be to use a Diffie-Helman approach for key-exchange in order to blind the message broker 103 from the encrypted data.

The expedited key exchange can also be used for signing message authenticity between intermediary 102*j* and agent 104.

C. Layer 7 Data (Data Transfer Optimization)

Application layer data can be piggybacked into the arrow 3, 4 signaling in FIG. 2. For example, assume that the source node 100 (client) is attempting to send an HTTP Get or other type of request to the destination node 101 (origin). Typically all of the connections along the path are established before Layer 7 data is transferred. Given that the signaling from intermediary 102*j* through message broker 103 to agent 104 in FIG. 2 is already taking place in order to establish the on-demand connection, there is an opportunity to include in that signaling a payload of layer 7 data (application layer data) that the client 100 wants to send to the origin 101. The payload could be anything, but one example is to include the application layer request (e.g., an HTTP Get) from the client. Thus, the agent 104 receives that request and—while the on demand connection is being established—the agent 104 can connect to the destination node 101 and relay the request. The destination node 101 may therefore begin working on generating a response, in parallel with creating the on-demand connection, which will be used to send the response once it and indeed the full path back to the source node 100 across the overlay network is ready. This can be thought of as a kind of pre-warmed direct server return technique.

It is also possible to piggyback application layer data in the network messaging that are sent outbound from the Agent 104 (such as arrow 5 in FIG. 2). For example, the Agent 104 can include application layer data in the SYN/ACK message it sends back to the intermediary node 102*j* as part of the TCP connection establishment. If the Agent 104 is running on the same system as the destination node 101, or otherwise tightly integrated with it, the Agent 104 might have the opportunity to include some or all of an application layer response to the source node 100. In other words, if the signal from the broker includes the application layer request as described in the preceding paragraph, then the Agent 104/Destination Node 101 can process that request and provide a response with the TCP SYN/ACK. The intermediary node 102*j* recognizes that payload and extracts it from the TCP packet for delivery to the source node 100 in a conventional way. It is not necessary that all of the response be provided in a SYN/ACK; the Agent 104 could send message headers or other portion, then follow up with a message body.

D. Tunnel Fan Out

In this embodiment, upon receipt of the signal to create the on demand connection, the agent 104 establishes more than one connection to the overlay network of intermediary nodes 102. So, for example, in addition to connecting to the intermediary node 102*j* that sent the signal, the agent 104 could connect to other nodes, e.g., nearby nodes 102*i* and 102*k*. This has several advantages, including:

1) The on-demand connections could "race" and the first one that gets established will be used.
2) Having multiple on-demand connections established allows for multi-channel data transmission.
3) Multiple on-demand connections can be used for high availability.

An alternate way to 'fan out' would be for the intermediary node 102*j* to send out-of-band signaling messages to multiple agents 104 (that is, multiple agents inside the private network). This approach would create multiple tunnels from inside the private network to the intermediary node 102*j*. The advantages would be similar to the ones mentioned directly above but for the private network to intermediary node leg of the path.

Figure 4:
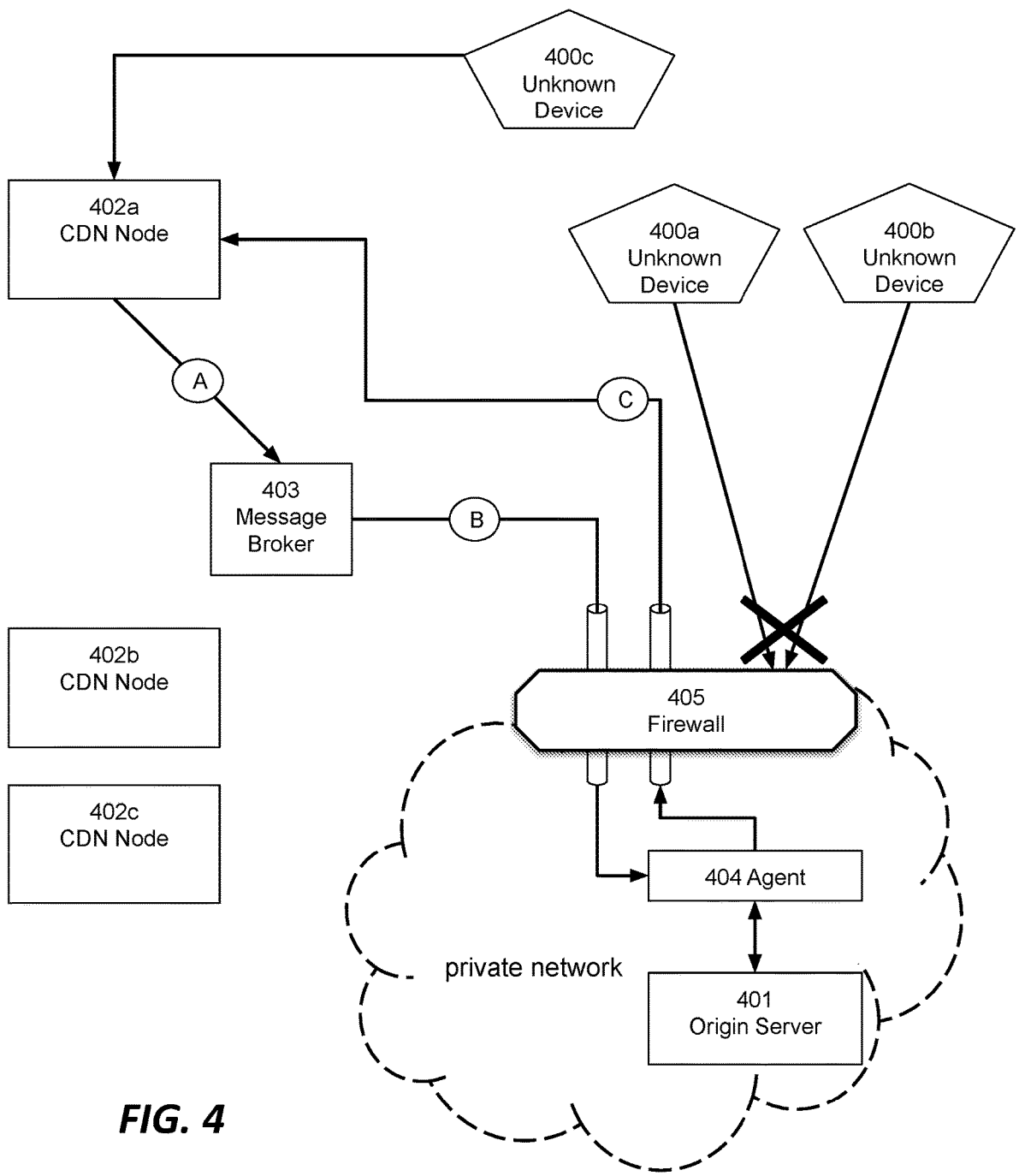
FIG. 4 is a diagram illustrating an embodiment providing a threat protection service for an origin in FIG. 1, in accordance with one embodiment of the teachings hereof; and, FIG. 5 is a block diagram illustrating hardware in a computer system that may be used to implement the teachings hereof.

Threat protection service. It is known in the art to protect an origin server (like destination node 101) from public Internet threats by restricting inbound access to a given set of servers in a content delivery network or other type of overlay: see U.S. Pat. No. 7,260,639, the contents of which are hereby incorporated by reference. The teachings of this patent document also likewise can be used to provide a protection service that extends the teachings of that patent. FIG. 4 illustrates this "threat protection service" embodiment.

Origin server 401 is deployed in a private network. Similar to FIGS. 1-2, a firewall 405 sits at the boundary of the private network from the public Internet. A content delivery network (CDN) service provider deploys many CDN nodes 402*a-c* (e.g., edge servers) around the Internet. These CDN nodes are configured as reverse proxy servers for origin server 401, as known in the art. The CDN deploys an agent 404 in the private network, as described before.

When they attempt to reach the origin server 401 directly, unknown client devices 400*a-b* are blocked at the firewall 405, as it is configured to block all IP addresses except for those configured in an "allow" list.

In contrast, unknown device 400*c* contacts CDN node 402*a* to request service or content from origin server 401. CDN node 402*a* can then perform a variety of security challenges, client reputation checks, user/device authentication routines, authorization routines, or the like. If unknown device 400*c* passes such security checks, CDN node 402*a* sends an signal for an on-demand connection to message broker 403 (line A), as described before in connection with FIG. 2. Message broker 403 relays this signal to the agent 404 (line B), which in response makes an on-demand connection through the firewall 405 to CDN node 402*a* (line C). Hence, CDN node 402*a* can proxy communications between the previously unknown but now verified device 400*c*, and the agent 404. As already described, the agent 404 can proxy communications to the origin server 401, so that device 400*c* to origin 401 communication can take place.

Any CDN node (e.g., 402*b*, 402*c*, etc.) might request an on-demand connection in the foregoing manner. Advantageously, the access-list of the firewall 405 does not need to be configured with the source IP address of every CDN node 402. Instead, origin server 401 can rely on the out-of-band signaling via broker 403 to set up forward paths from a relevant CDN node 402 on an as-needed basis, trusting that it is only the CDN creating these reverse tunnels. Reliance is based on authentication of the message broker 403 and agent 404, and the security of the out of band communication channel (lines A to B).

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
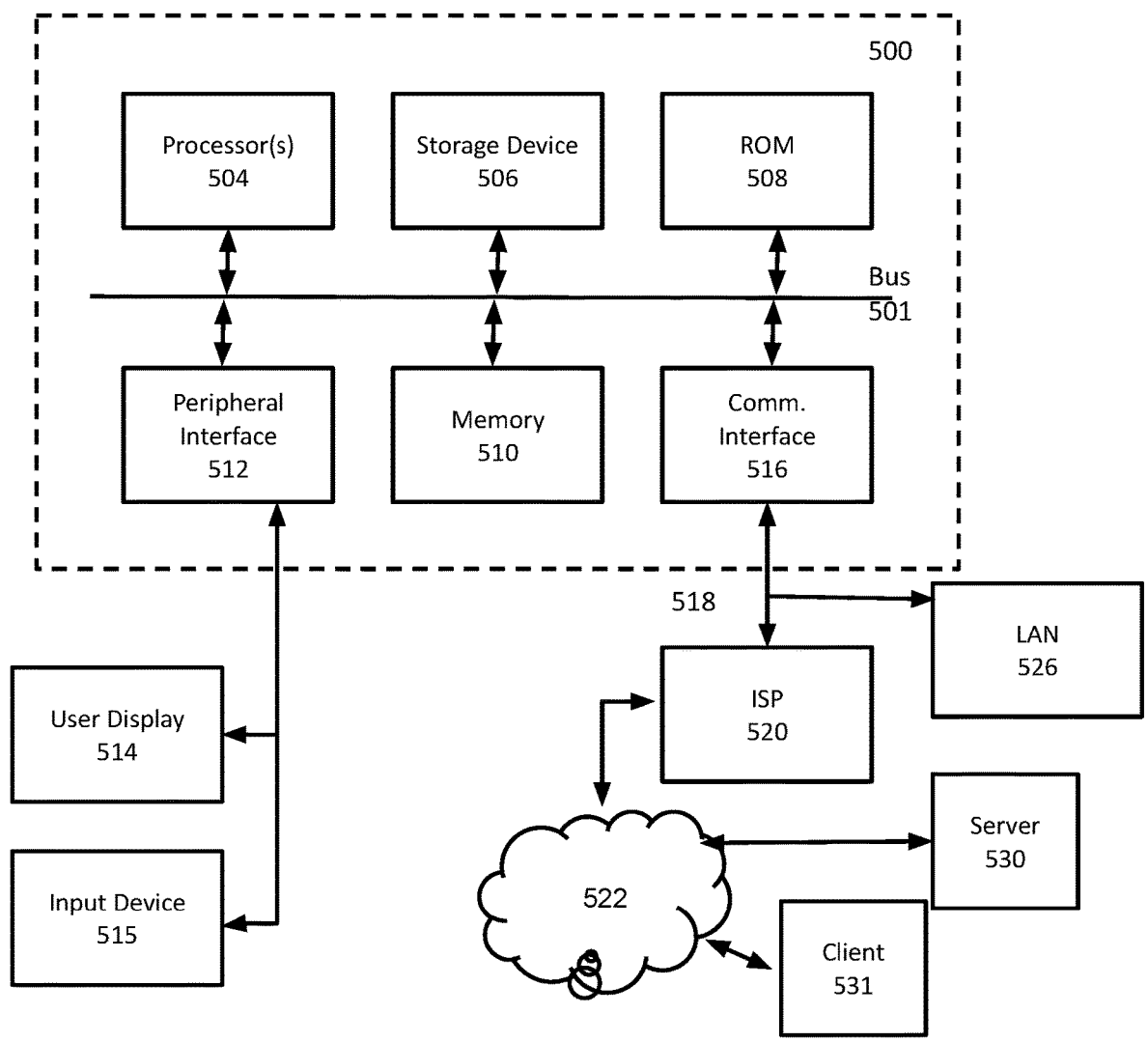

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 may be provided to communicatively couple computer system 500 to a user display 514 that displays the output of software executing on the computer system, and an input device 515 (e.g., a keyboard, mouse, trackpad, touchscreen) that communicates user input and instructions to the computer system 500. However, in many embodiments, a computer system 500 may not have a user interface beyond a network port, e.g., in the case of a server in a rack. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer,) between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 518 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:
1. A method, comprising:
  deploying an intermediary node on a network such that the intermediary node is accessible, over the public Internet, to a first node;
  at the intermediary node:
    receiving one or more messages from the first node,
    determining that the first node desires a private service provided by a second node, the second node located in a private network that is separate and distinct from the network in which the intermediary node is deployed, responsive to the determination, sending a signal that instructs an agent in the private network to make an on-demand connection from inside the private network across a boundary of the private network to the intermediary node;

establishing the on-demand connection with the agent, and subsequent to establishing the on-demand connection with the agent, relaying application layer data between the first node to the second node through the on-demand connection, and in response to establishing the on-demand connection with the agent, providing the private service to the first node;

including, in the signal, information for use by the agent to accelerate a time necessary to begin said providing of the private service;

wherein each of the first node, the intermediary node, and the second node comprises, respectively, computer program instructions executing on at least one hardware processor.

2. The method of claim 1, further comprising:
prior to receiving the one or more messages from the first node, selecting the intermediary node from amongst a plurality of intermediary nodes that form an overlay network on the public Internet, and directing the first node to the intermediary node.

3. The method of claim 1, wherein the agent comprises software running on the second node.

4. The method of claim 1, further comprising:
the intermediary node publishes the signal on a channel to which the agent is subscribed.

5. The method of claim 1, wherein sending the signal comprises sending the signal to a message broker located outside of the private network, which delivers the one or more messages into the private network via a secure channel.

6. The method of claim 1, wherein the information for use by the agent to accelerate the time necessary to begin said providing of the private service comprises at least one of:
a connection handshake message for the on-demand connection;
key material used for securing the on-demand connection; and,
an instruction to connect to the second node while establishing the on-demand connection.

7. The method of claim 1, wherein the information for use by the agent to accelerate the time necessary to begin said providing of the private service comprises at least one of:
a request from the first node; and, application layer data.

8. The method of claim 1, wherein a firewall marks the boundary of the private network, the on-demand connection between the second and the intermediary nodes being established through the firewall.

9. The method of claim 1, the private network comprising an enterprise network.

10. The method of claim 1, wherein the signal instructs the agent in the private network to make a plurality of on-demand connections from inside the private network across a boundary of the private network to at least one of (i) the intermediary node and (ii) a plurality of intermediate nodes including the intermediary node.

11. The method of claim 1, wherein the signal further instructs one or more additional agents in the private network to each make respective on-demand connections from inside the private network across the boundary of the private network to at least one of (i) the intermediary node and (ii) a plurality of intermediary nodes which include the intermediary node.

12. A system comprising circuitry forming at least one processor and memory storing computer program instructions for execution on the at least one processor, the computer program instructions including instructions that upon said execution will cause the system to provide first, intermediary, and second nodes to:
run the intermediary node on a network such that the intermediary node is accessible, over the public Internet, to the first node;
at the intermediary node:
receive one or more messages from the first node,
determine that the first node desires a private service provided by the second node, the second node located in a private network that is separate and distinct from the network in which the intermediary node is deployed,
responsive to the determination, send a signal that instructs an agent in the private network to make an on-demand connection from inside the private network across a boundary of the private network to the intermediary node;
establish the on-demand connection with the agent, and subsequent to establishing the on-demand connection with the agent, relay application layer data between the first node to the second node through the on-demand connection, and in response to establishing the on-demand connection with the agent, providing the private service to the first node;
include, in the signal, information for use by the agent to accelerate a time necessary to begin said providing of the private service.

13. The system of claim 12, the computer program instructions including instructions that upon said execution will cause the system to:
prior to receiving the one or more messages from the first node, select the intermediary node from amongst a plurality of intermediary nodes that form an overlay network on the public Internet, and directing the first node to the intermediary node.

14. The system of claim 12, wherein the agent comprises software running on the second node.

15. The system of claim 12, the computer program instructions including instructions that upon said execution will cause the system to:
have the intermediary node publish the signal on a channel to which the agent is subscribed.

16. The system of claim 12, wherein sending the signal comprises sending the signal to a message broker located outside of the private network, which delivers the one or more messages into the private network via a secure channel.

17. The system of claim 12, wherein the information for use by the agent to accelerate the time necessary to begin said providing of the private service comprises at least one of:
a connection handshake message for the on-demand connection;
key material used for securing the on-demand connection; and,
an instruction to connect to the second node while establishing the on-demand connection.

18. The system of claim 12, wherein the information for use by the agent to accelerate the time necessary to begin said providing of the private service comprises at least one of:
a request from the first node; and,
application layer data.

19. The system of claim 12, wherein a firewall marks the boundary of the private network, the on-demand connection between the second and the intermediary nodes being established through the firewall.

20. The system of claim 12, the private network comprising an enterprise network.

21. The system of claim 12, wherein the signal instructs the agent in the private network to make a plurality of on-demand connections from inside the private network across a boundary of the private network to at least one of (i) the intermediary node and (ii) a plurality of intermediate nodes including the intermediary node.

22. The system of claim 12, wherein the signal further instructs one or more additional agents in the private network to each make respective on-demand connections from inside the private network across the boundary of the private network to at least one of (i) the intermediary node and (ii) a plurality of intermediary nodes which include the intermediary node.

23. A non-transitory computer readable medium storing computer program instructions for execution on at least one processor, the computer program instructions including instructions for:

deploying an intermediary node on a network such that the intermediary node is accessible, over the public Internet, to a first node;

at the intermediary node:

receiving one or more messages from the first node, determining that the first node desires a private service provided by a second node, the second node located in a private network that is separate and distinct from the network in which the intermediary node is deployed, responsive to the determination, sending a signal that instructs an agent in the private network to make an on-demand connection from inside the private network across a boundary of the private network to the intermediary node;

establishing the on-demand connection with the agent, and subsequent to establishing the on-demand connection with the agent, relaying application layer data between the first node to the second node through the on-demand connection, in response to establishing the on-demand connection with the agent, providing the private service to the first node;

including, in the signal, information for use by the agent to accelerate a time necessary to begin said providing of the private service.

\* \* \* \* \*